Dec. 3, 1940.　　　　I. C. JENNINGS　　　　2,223,689
CONTROL MECHANISM FOR STEAM HEATING SYSTEMS
Filed Nov. 24, 1934　　　　8 Sheets-Sheet 1
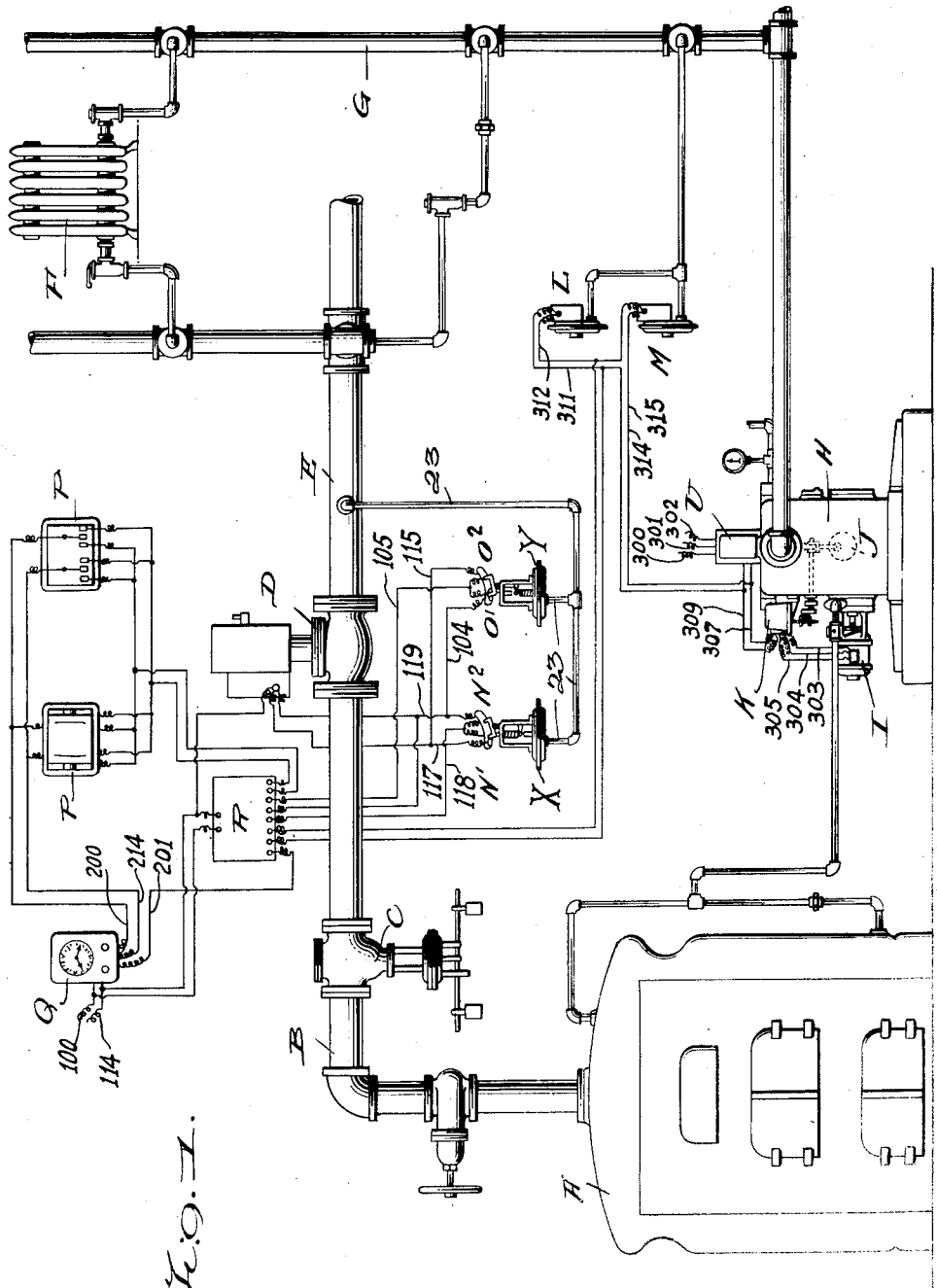
Inventor
I. C. Jennings
By Southgate Fry & Hawley
Attorneys

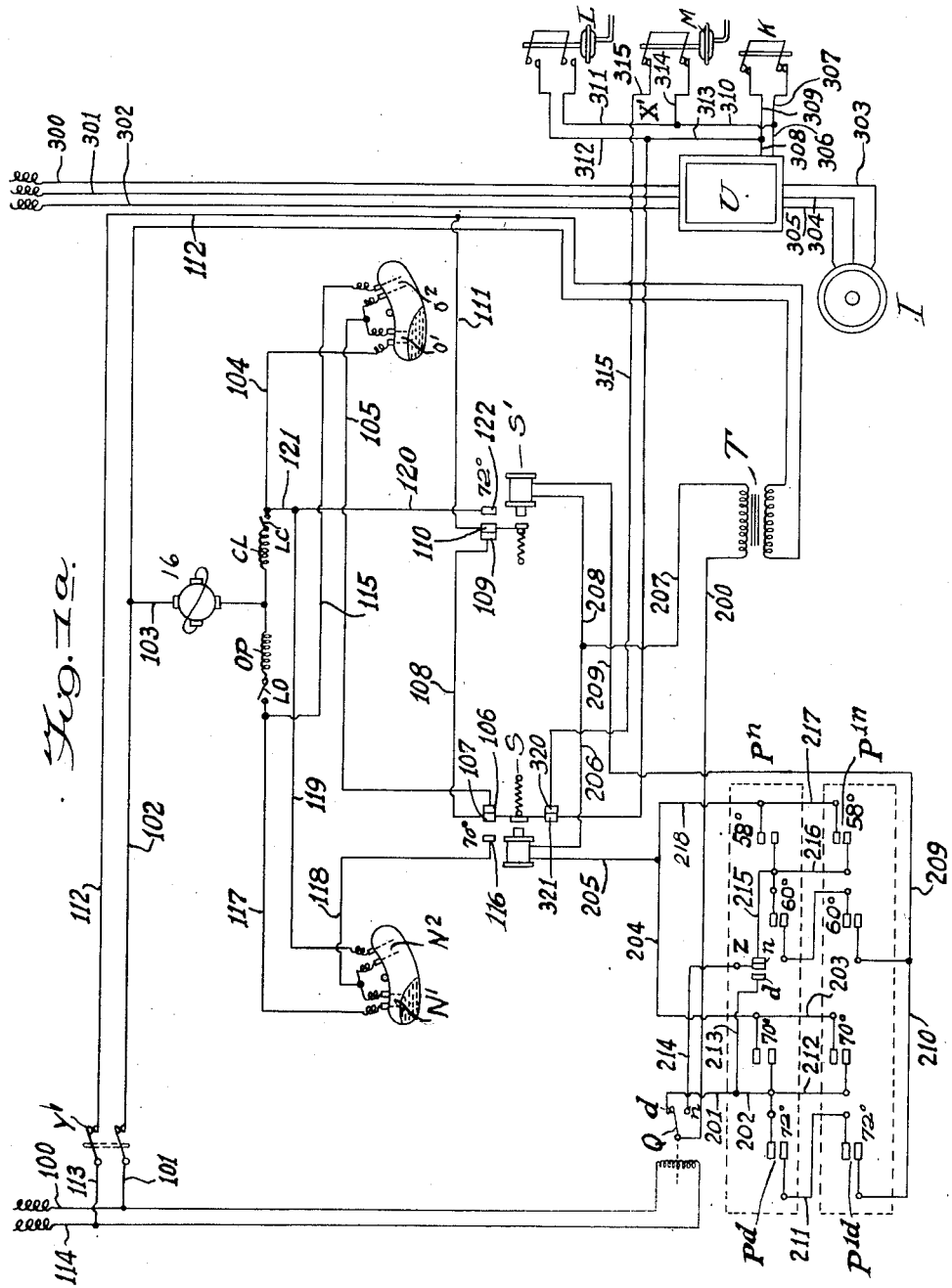

Dec. 3, 1940.   I. C. JENNINGS   2,223,689
CONTROL MECHANISM FOR STEAM HEATING SYSTEMS
Filed Nov. 24, 1934   8 Sheets-Sheet 3
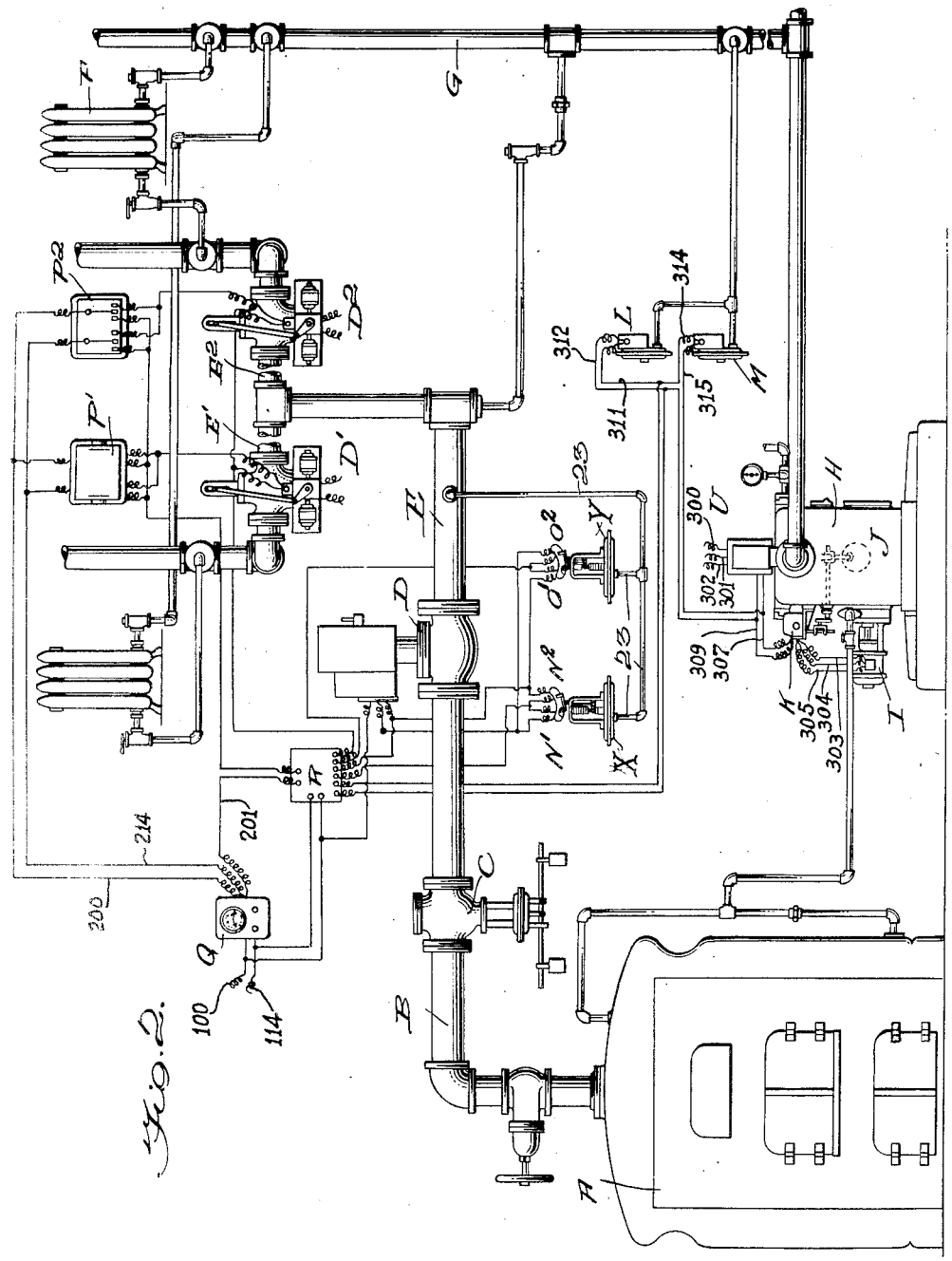
Inventor
I. C. Jennings
By Southgate Fry & Hawley
Attorneys

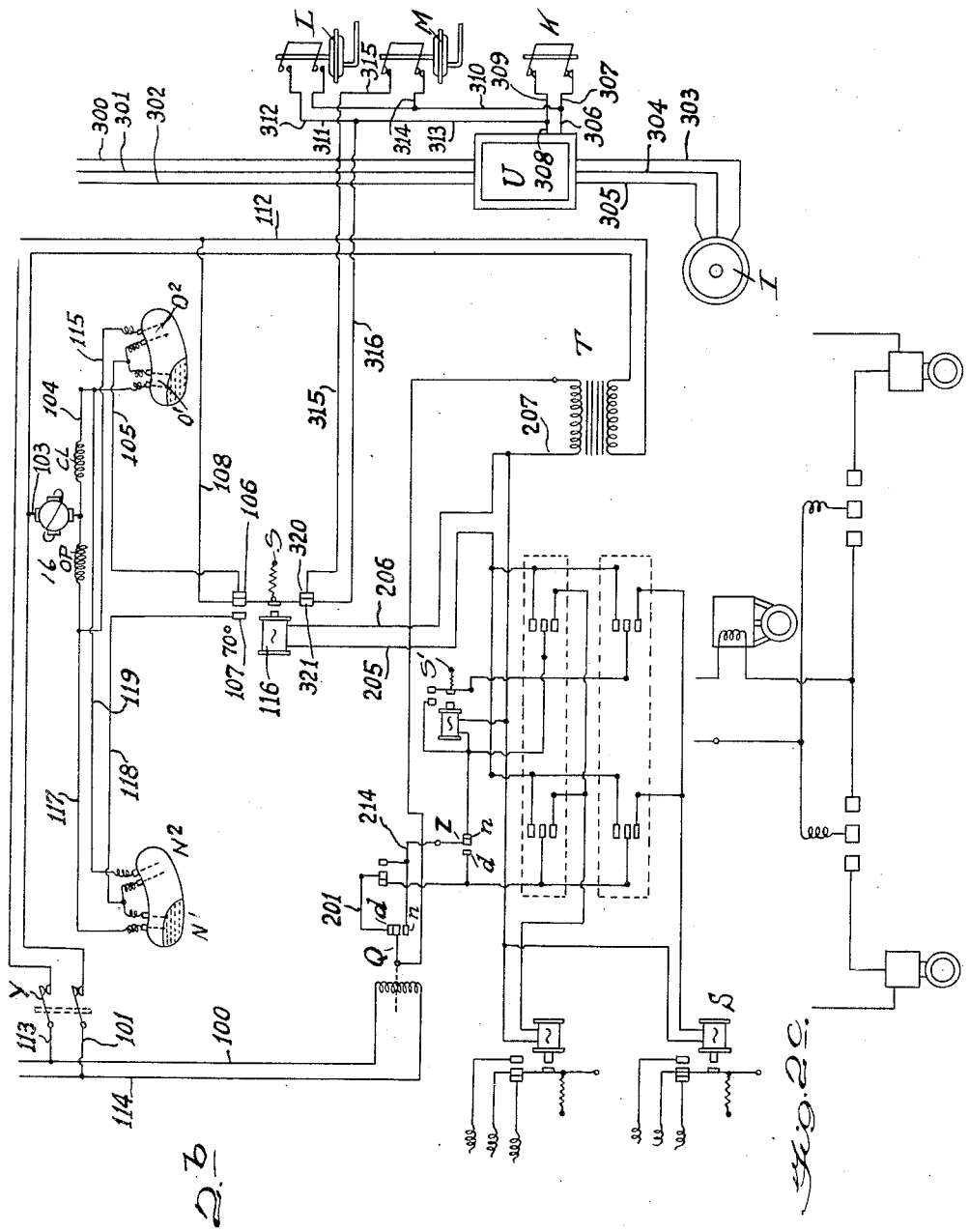

Dec. 3, 1940.  I. C. JENNINGS  2,223,689
CONTROL MECHANISM FOR STEAM HEATING SYSTEMS
Filed Nov. 24, 1934  8 Sheets-Sheet 5
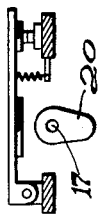
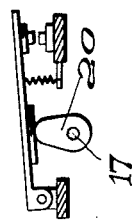
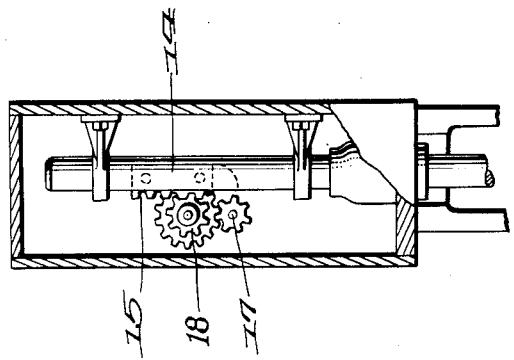
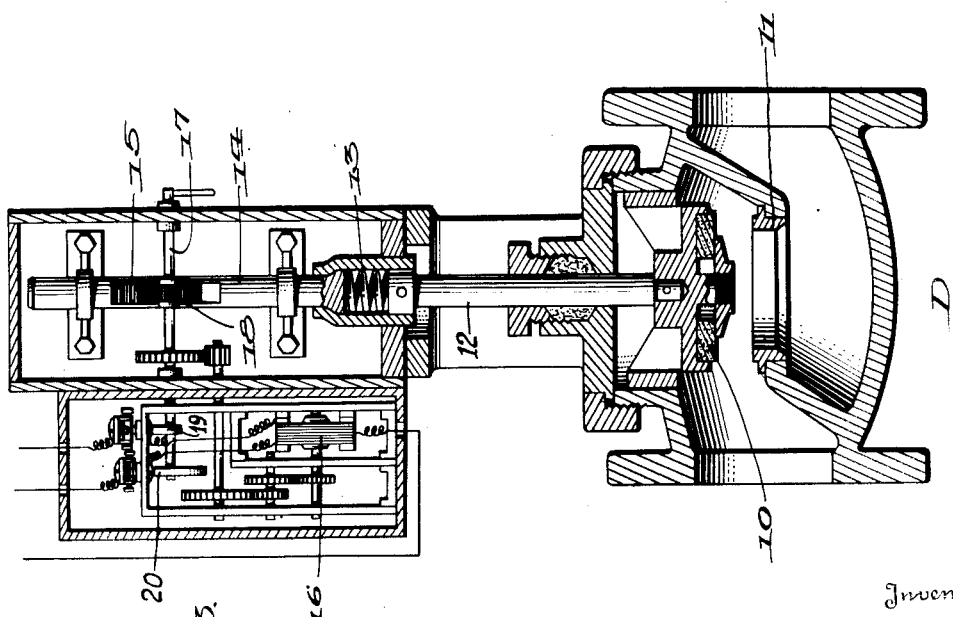
Inventor
I. C. Jennings,
By Southgate Fay & Hawley
Attorneys

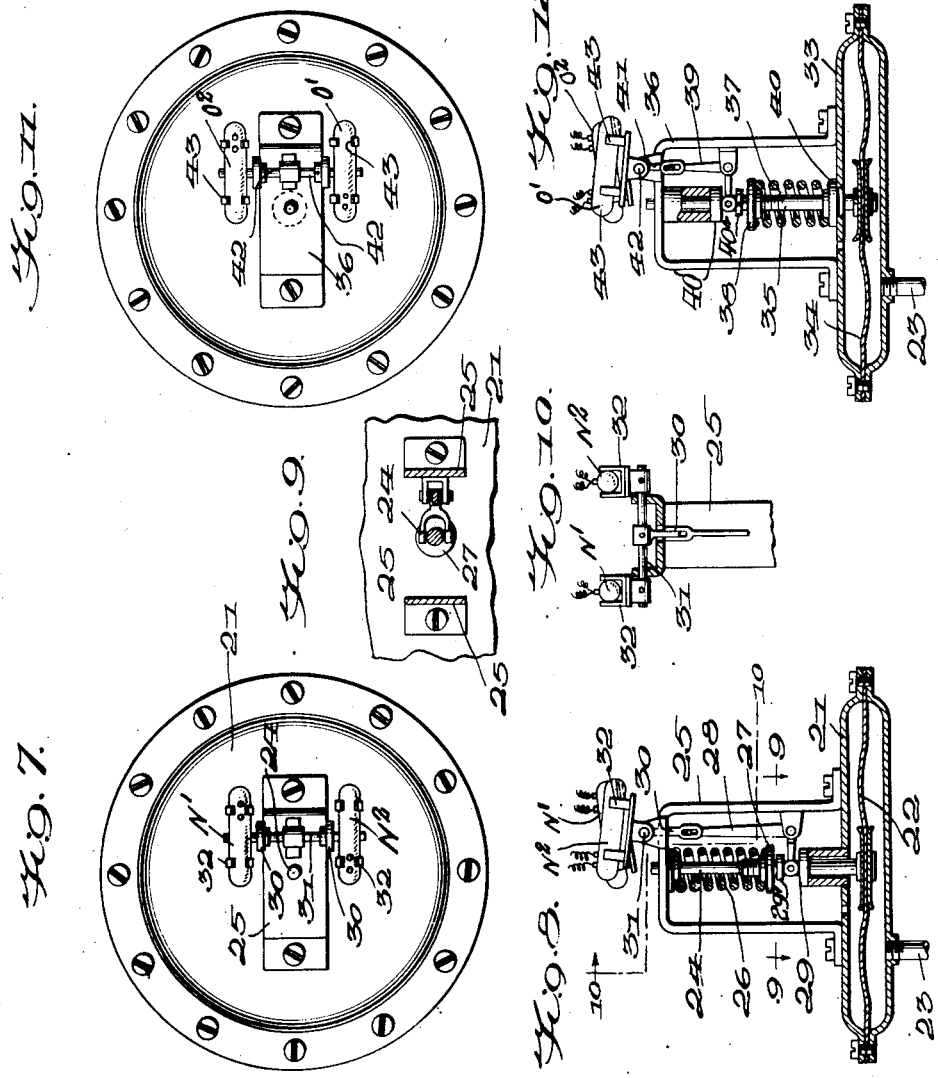

Dec. 3, 1940.  I. C. JENNINGS  2,223,689
CONTROL MECHANISM FOR STEAM HEATING SYSTEMS
Filed Nov. 24, 1934  8 Sheets-Sheet 7
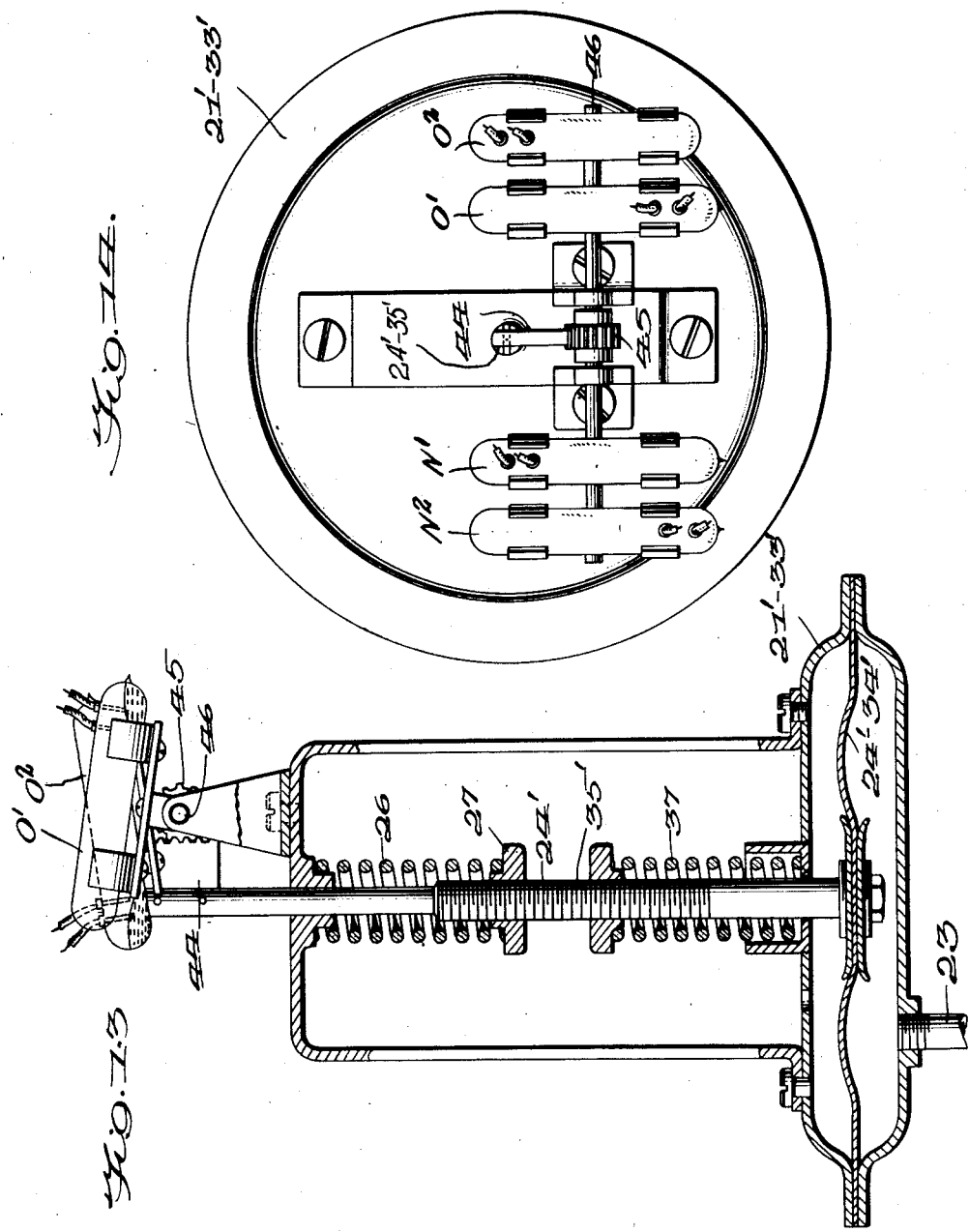
Inventor
I. C. Jennings,
By Southgate Fry & Hawley
Attorneys Patented Dec. 3, 1940

2,223,689

UNITED STATES PATENT OFFICE 2,223,689

CONTROL MECHANISM FOR STEAM HEATING SYSTEMS

Irving C. Jennings, South Norwalk, Conn.

Application November 24, 1934, Serial No. 754,674

16 Claims. (Cl. 237—9)

This invention relates to a control mechanism for a steam heating system and particularly for a vacuum steam heating system.

A vacuum steam heating system consists of a source of steam supply connected to the radiators and a pumping mechanism connected to the returns from the radiators. This pumping mechanism consists of a tank connected so that the air and gas in the returns will be separated and pumped out of the system and so as to create a vacuum, that is a pressure below atmospheric pressure, in the returns. A water pump is also usually employed to remove the water of condensation and generally to return the same to the boiler.

The improved control mechanism consists of a steam valve placed in the steam supply, which valve is motorized or automatically operated, preferably by an electric motor so as to maintain in the supply a relatively high pressure, or a lower pressure, or to shut off entirely the flow of steam to the system.

Two controllers are provided to cut said electric motor into and out of operation; one controller being provided to supply an increased pressure of steam and the other controller being provided to supply a decreased pressure of steam.

The increase and decrease controllers are connected to and operated by the pressures in the pipe leading steam from the steam valve to the radiators and these controllers operate switches which, as selected by thermostats, control the operation of the electric motor operating the steam valve.

Two vacuum controllers are provided to throw the vacuum pump into and out of operation to produce either one of a plurality of vacuums in the returns of the system or sometimes to cut the vacuum pump entirely out of operation.

The parts are so arranged and combined, that, first, normally the steam valve will be partly opened to allow a throttled supply of steam under a low pressure to pass to the radiators and so that the vacuum pump is operated and controlled to produce a high vacuum; second, so that if the area to be heated becomes too cool, the steam valve will be opened wider to give a higher pressure of steam and the vacuum pump will be controlled and operated to produce a low vacuum in the returns; and, third, so that if the area to be heated becomes too hot, the steam valve will be closed but the vacuum pump will continue to operate so that there will be full vacuum available for circulation as soon as the area to be heated returns to normal temperature.

In some instances when the steam valve is closed, the vacuum controller may be set so that the vacuum pump will be cut entirely out of operation.

In some installations, the building to be heated may be zoned and additional thermostatically controlled shut off valves may be employed so that steam can be cut off from any particular zone if it gets too hot.

By these arrangements steam can be very economically used and the building or area to be heated can be kept accurately at a uniform temperature.

The invention is illustrated in the accompanying eight sheets of drawings, referring to which:

Fig. 1 is a diagrammatic elevation illustrating the application of my invention to a vacuum steam heating system.

Fig. 1a is a diagram illustrating the electrical connections used in the apparatus shown in Fig. 1.

Fig. 2 is a view similar to Fig. 1 illustrating a further carrying out of my invention, showing how the same can be connected to control the temperature in a plurality of zones.

Fig. 2b is a wiring diagram showing the electrical connections used in the apparatus shown in Fig. 2.

Fig. 2c is an additional diagram showing the wiring to the additional zone shut-off valves.

Fig. 3 is a sectional elevation illustrating the steam valve and the mechanism employed to open, close or hold the same in intermediate position.

Fig. 4 is a partial central sectional elevation at right angles to Fig. 3.

Figs. 5 and 6 are detail views showing the cut out or limit switches employed in connection with the electric motor.

Fig. 7 is a plan view, and Fig. 8 a central sectional elevation of the steam increase supply controller.

Fig. 9 is a cross sectional plan view on the line 9—9 of Fig. 8.

Fig. 10 is a central sectional elevation on the line 10—10 of Fig. 8.

Fig. 11 is a plan view and Fig. 12 a central sectional elevation of the steam decrease supply controller.

Fig. 13 is a central sectional elevation, and Fig. 14 is a plan on an enlarged scale showing a modification by which both steam supply controllers are made as a unit structure.

Figure 17:
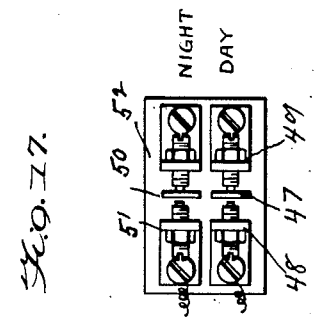
Fig. 17 is a cross sectional elevation showing the contacts used in the thermostat.

Referring to the drawings and in detail, A designates a steam boiler, extending from which is a steam pipe B, in which is arranged an automatically operating pressure regulator C. This regulator C may be adjusted so that the pressure in the steam pipe beyond the regulator C may be kept constant, say at five pounds. A motorized steam valve D is arranged in the steam pipe beyond the pressure regulator C, and the pipe E beyond the valve D constitutes the supply pipe for the heating system or radiators F.

The radiators F are supplied with the usual valves and traps and are connected by pipes to a return G, which is connected to the receiving tank H of the pumping mechanism.

This pumping mechanism, as shown, consists of a well known unit, comprising a Nash vacuum pump for creating and maintaining a vacuum in the returns G and a centrifugal impeller for removing the water of condensation, and preferably returning the same to the boiler A.

The rotor of the vacuum pump and the impeller of the water pump are usually arranged on a common shaft, which is driven by an electric motor I, which is thrown into and out of operation by a float J arranged in the tank H operating a switch K; and also by one or the other of a plurality of vacuum pump controllers L and M.

The details of this vacuum pumping mechanism are well known and are shown and described for instance in Letters Patent of the United States, No. 1,592,024, granted to me July 13, 1926.

The foregoing, with the exception of the employment of a plurality of vacuum pump controllers, comprises the main or principal elements of a well known vacuum steam heating system, by which steam under a vacuum, that is under a pressure below that of the atmosphere, can be circulated and employed to heat an area or building.

The details of the motorized steam valve D, shown in Figures 3 and 4 of the drawings, will now be described.

The same consists of a valve 10 cooperating with a valve seat 11. The valve 10 is arranged on a stem 12, which is connected by a yielding joint 13 to a secondary stem 14 carrying a rack 15. An electric motor 16 is connected by a triple train of reducing gearing to drive a shaft 17 carrying a pinion 18 meshing with the rack 15. The shaft 17 is provided with cams 19—20 to break the electrical connections to the motor, when the valve is moved to its extreme open or closed position, and thus acting as limiting switches so that when the valve is fully open or closed, the motor will stop.

The yielding joint 13 is provided so that when the valve is closed, the motor 16 will not come up against a dead stop.

By this arrangement, the valve can be opened, closed or moved to an intermediate position.

The details of the steam increase controller X, shown in Figs. 7 to 10, inclusive, will now be described. The same consists of a casing 21 in which is arranged a diaphragm 22. The space in the casing below the diaphragm is connected by a pipe 23 to the steam supply pipe E extending from the motorized valve D. A rod or plunger 24 is connected to the diaphragm 22. The top end of the rod 24 is fitted in a yoke or bracket 25. A spring 26 is arranged between the bracket 25 and a nut 27 adjustably threaded on the rod 24. A pivoted bell crank lever 28 extends between collars 29 and 29' secured on the rod 24. The upper end of the bell crank lever 28 is pivoted to an arm 30 depending from a shaft 31 journalled in arms extending upwardly from the bracket 25. Clamps 32—32 are secured on shaft 31 and mercoid electric switches $N^2$ and $N'$ are held in these clamps.

By the electrical connections hereinafter described, these mercoid switches $N^2$ and $N'$ control the opening and closing operation of the electric motor 16, which operates the steam valve D.

It will be noted that by turning the nut 27, the pressure below the diaphragm 22 necessary to rock the mercoid switches $N^2$ and $N'$ can be adjusted and determined.

The details of the steam decrease controller Y shown in Figs. 11 and 12 will now be described. The same consists of a casing 33 in which is arranged a diaphragm 34. The space in the casing below the diaphragm is connected to the pipe 23 extending from the steam supply pipe E. A rod or plunger 35 is connected to the diaphragm 34. The top end of the rod is fitted in a yoke or bracket 36. A spring 37 is arranged between the collar 40 abutting on casing 33 and a nut 38 adjustably threaded on the rod 35. A pivoted bell crank lever 39 extends between collars 40' and 40'' secured on the rod 35. The upper end of the bell crank lever 39 is pivoted to an arm 41 depending from a shaft 42 journalled in arms extending upwardly from the bracket 36. Clamps 43—43 are secured on the shaft 42 and mercoid electric switches $O'$ and $O^2$ are held in these clamps. By the electrical connections hereinafter described these mercoid switches $O'$ and $O^2$ control the opening and closing operation of the electric motor I.

The vacuum pump controllers are ordinary vacuum switches set to close a circuit until a certain adjusted vacuum is reached and then to open the circuit.

In the apparatus being described, the vacuum pump controller M is set to permit the creation and maintenance of a vacuum of twenty-three inches in the returns before cutting out, and the low vacuum pump controller L is set to cut out at five inches of vacuum.

The steam decrease controller Y last described is substantially the same as the steam increase controller X previously described, except that the spring 37 is set to oppose the downward movement of the diaphragm 34, while the spring 26 used in the steam increase controller is set to oppose the upward movement of the diaphragm 22.

Thus the operation of the steam increase controller is the same as the steam decrease controller Y except that in the steam increase controller X, the diaphragm moves upwardly against an adjusted spring pressure, while in the steam decrease controller Y, the diaphragm moves downwardly against an adjusted spring pressure.

In some instances, I contemplate making the steam increase controller X and the steam decrease controller Y as a unit structure, as shown in Figs. 13 and 14. In this arrangement the springs 26 and 37 are arranged on a common rod 24'—35' and only one diaphragm 22'—34' is employed in the casing 21'—33'. The rod 24'—35' carries a rack 44, which meshes with a pinion 45 secured on shaft 46 carrying all the mercoid switches.

In the diagrammatic Figures 1 and 2, and in the diagrams of the electric wiring, Figs. 1a and 2b, double pole mercoid switches are shown for the purposes of explanation, but in actual practice, two single pole mercoid switches are employed both in the steam increase controller X and in the steam decrease controller Y.

The apparatus is thermostatically controlled.

A plurality of thermostats P may be employed and connected electrically in multiple so that the control may come from different key positions in the building.

Figure 16:
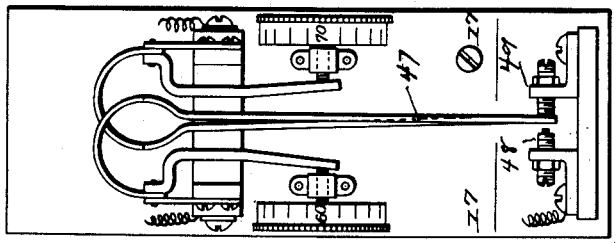
Fig. 16 is a similar view with the front cover thereof taken off.
Figure 15:
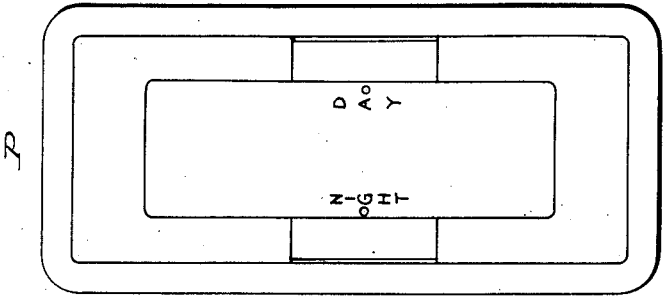
Fig. 15 is a front elevation of one of the thermostats employed.

One of the thermostats is shown in Figs. 15, 16 and 17 of the drawings.

Each thermostat is preferably made double or duplex having a thermostatic arm 47 cooperating with two contacts 48 and 49, and a second thermostatic arm 50 cooperating with two contacts 51 and 52. The parts 47, 48 and 49 are arranged in one control circuit, which is used for controlling the temperature in the daytime, or normally, and the parts 50, 51 and 52 are arranged in another control circuit which is employed in the night time and holidays, when the building can be kept at a lower temperature to save steam.

A time clock Q preferably is used to shift the control automatically from one circuit to the other.

A relay box R is set at any convenient position and the electrical connections extend to and from the same. This relay box contains two relays S and S' and a transformer T.

The electrical energy for the control may be taken from an ordinary single phase 110 volt A. C. circuit, which is stepped down through the transformer T, so that the current employed in the thermostats may be of low voltage. The current employed to drive the motor I may be 220 volt three phase A. C., which is connected to a magnetic starter U.

The adjustments may be such as to maintain a day temperature of normally 71 degrees, withing limits of 70 and 72 degrees, and the adjustments for night temperature may be such as to maintain a temperature of 61 degrees within limits of 60 and 62 degrees Fahrenheit.

U indicates a commercial type of magnetic starter controlled by the high vacuum controller or regulator M, the low vacuum controller L and float switch K connected to the pilot circuit.

As the condensate collects in receiver tank H of Fig. 1, the float switch K is closed by ball float J at a predetermined level and current flows from one line terminal in motor starter U, Fig. 1a, along lines 306—307 through closed contacts of float switch K, along lines 309—308, through the pilot magnetic circuit of starter U to the other side, of one phase, thus energizing the magnetic switching mechanism and through lines 303—304—305, operating motor I and air and water pump, lowering the condensate level until ball float J opens float switch contacts.

To maintain the desired vacuum condition, say 20" vacuum steam, a current flows from one line terminal in motor starter U, along lines 306—310—314, through closed contacts of vacuum regulator M, along lines 315, through closed contacts 320—321 of relay S, along lines 313, 308, through the magnetic circuit of starter U to the other side of one phase, thus energizing the magnetic switching arrangement, and through lines 303—304—305, operating the motor I driving the air and water pump, thereby increasing the vacuum to say 23" when the vacuum regulator M opens, interrupting the magnetic circuit of starter U, thus stopping the motor I and pump. As the vacuum level drops to say 21" the vacuum switch M again closes and above operation is repeated.

When the area to be heated becomes sufficiently cold to demand say 1# pressure steam, relay S is actuated by the thermostat circuit and contacts 320—321 are opened, thus disconnecting high vacuum regulator M from service. Due to vacuum regulator L being set to operate at say 8" it will now become effective to maintain a 5" vacuum on return lines with 1# pressure steam on supply.

The operation is as follows, referring first to the day operation:

The term "inches of vacuum" is used hereafter to refer to the pressure below that of the atmosphere, measured by a mercury column, two inches of such column substantially equalling a pressure of one pound.

Referring to Figs. 1 and 1a, the thermostats are all shown in the middle position for day operation. The normal temperature of 71 degrees is supposed to be maintained throughout the entire area. Steam valve D has assumed a throttling position to give a pressure of say twenty inches of vacuum in the supply pipe E and the vacuum pump controller M has caused the vacuum pump to create and maintain a vacuum of twenty three inches in the returns G. This will give a differential of three inches between the supply E and the returns G from the radiators and will provide for a smooth and economical steam circulation, giving an even, mild heat in the radiators.

If the steam at twenty inches of vacuum and this differential of three inches is not sufficient to maintain the temperature of 71 degrees in the building, and the same drops to 70 degrees, one of the thermostat controlling arms 47 will move over to one of the contacts marked 70, Fig. 1a, which will throw in the circuit which energizes the magnet of the relay S, and cause contact to be made in the relay in the point marked 70, Fig. 1a. This disconnects the mercoids of the steam decrease controller Y and connects the mercoids of the steam increase controller X, which now closes the circuit operating to open the valve D until the steam pressure rises to one pound in the supply pipe E. This pressure will move the steam increase controller until its mercoids N² and N' are level and so that the circuits controlled by the same are broken.

The steam pressure now remains constant at one pound until the building is brought up to the proper temperature, say 71 degrees, when the circuit in the thermostat is opened and the valve D is returned to the twenty inch setting for normal operation.

During this operation, with one pound pressure in the supply pipe E, the vacuum pump controller M is disconnected, and the vacuum pump controller L is connected which allows the vacuum pump to create and maintain a vacuum of five inches. This pound pressure in the supply and five inches vacuum in the returns gives a working differential of about seven inches, which will cause the steam to circulate more rapidly to quickly bring the pressure in the radiators up to the higher pressure of one pound.

When the area to be heated is brought up to normal temperature of 71 degrees, the parts will return to the position shown in Figs. 1 and 1a to work on the twenty three inches vacuum and three inch differential, before described.

When the building becomes too hot, a thermostat arm closes a contact 72, Fig. 1a. The relay S' is energized and the electric motor 16 is operated to move the valve 10 of the motorized steam valve D to its seat 11. This will shut off the passage of steam to the heating system or radiators. Under this condition the heating system will be cut entirely out of operation, and there will be no circulation in the radiators.

This condition will continue until the too hot area returns to normal temperature, when the parts will return to the positions for normal operation, as shown in Figs. 1 and 1a.

Specific examples of conditions of operation are as follows. First, assume an inside temperature of 70° F., or below, with the time switch Z in day or high level position, and all other conditions as shown, we have a situation which might be termed a 1# pressure steam position.

Current now flows from low voltage transformer T, along line 200, through the $d$ contacts of time switch Q, along lines 201—202, through closed 70° contacts of thermostat P$^d$ and P$^{1d}$, along lines 203—204—205, through electro-magnet of relay S, along lines 206—207 to complete low voltage circuit and to energize the electromagnet of relay S, causing its contact-carrying armature to move against the magnetized core, thus closing contacts 116—107 and opening contacts 106—107, also opening contacts 320—321. Current now flows from 110 v. supply along 100—101, through line switch Y', along 102—103, through motor 16 and field OP, through closed contacts of limit switch LO, along line 117 through closed contacts of mercury switch N' of steam increase pressure selector X of Fig. 1 along line 118, through closed contacts 107 and 116 of relay S, along line 108 through closed contacts 109—110 of relay S', along lines 111—112, through line switch Y', along lines 113 and 114, completing circuit and energizing motor 16, causing valve D of Fig. 1 to open, admitting pressure steam to supply line E. As the valve D, Fig. 1, reaches full open position, the cam 19, identical to 20, Figs. 5 and 6, contacts limit switch LO, interrupting the circuit and de-energizing motor 16. As the relay S also opens contacts 320 and 321, thus discontinuing high vacuum regulator M, placing the low vacuum regulator L in control of motor and pump I and Ip, the vacuum in supply line E now rapidly decreases toward zero and pressure builds up to 1#. The pressure selector X of Fig. 1, through its mechanism actuated by pressure in pipe 23, moves the mercury switches N$^1$ and N$^2$ until say at 1¼#, mercury switch N$^1$ is open and N$^2$ is closed, causing current to flow from 110 v. supply along 100—101, through line switch Y', along lines 102—103, through motor 16 and field CL, through closed contacts of limit switch LC, along lines 121—119, through closed contacts of mercury switch N$^2$, along lines 118, through contacts 116—107 of relay S, along line 108, through contacts 109—110 of relay S', along lines 111—112, through line switch Y', along lines 113—114, completing the circuit, energizing motor 16 and moving valve D, Fig. 1, toward closed position, thus, by throttling, reducing the pressure in line E and also in pipe 23.

As the pressure falls, the steam increase pressure selector X, through its mechanism, retracts the position of mercury switches N$^1$ and N$^2$ until at say 1# both N$^1$ and N$^2$ are open-circuited and the valve is held in this position until a variation in pressure causes the closing of either N$^1$ or N$^2$, thus causing motor 16 to operate and valve D to open or close as required to maintain 1# pressure steam in line E and pipe 23.

Low vacuum regulator L maintains a minimum of say 5" on return line G, Fig. 1.

For a different condition, we might assume an inside temperature of 71° F., with time switch Q in day or high level condition, as shown, this being what might be termed a 20" vacuum steam position.

No current flows in the low voltage transformer circuit. Current flows from the 110 v. supply lead 100, along line 101, through line switch Y', along 102, 103, through motor 16 and field CL, through closed contacts of limit switch LC, along line 104 through closed contacts of mercury switch O', along line 105, through closed contacts 106—107 of relay S, along line 108, through closed contacts 109—110 of relay S', along lines 111—112, through line switch Y', along lines 113 and 114 to complete circuit, energizing motor 16, causing valve D, Fig. 1, to close in steam supply line E. As valve D seats, cam 20, Fig. 6, contacts limit switch LC, causing it to interrupt the motor circuit and position the valve at full closed.

As the vacuum in supply line E rises due to the operation of the vacuum heating pump I as heretofore described, the vacuum selector Y of Fig. 1 is actuated through pipe line 23 and via its mechanism moves the mercury switches O$^1$ and O$^2$ until say at 21" a position has been reached at which mercury switch O$^1$ is open-circuited and O$^2$ is closed, establishing a circuit and current flow from 110 v. supply lead 100 along line 101, through one side of line switch Y', along lines 102—103, through motor 16 and field O$^P$, through closed contacts of limit switch LO, along line 115 through closed contacts of mercury switch O$^2$, along line 105, through closed contacts 106—107 of relay S, along line 108, through closed contacts 109—110 of relay S', along lines 111—112 through line switch Y', along lines 113—114, completing circuit and energizing motor 16, causing valve D, Fig. 1, to move toward the open position, admitting pressure steam to supply line E, thus reducing the vacuum to say 20", at which point the mechanism of vacuum selector Y, Fig. 1, has retracted the mercury switches O$^1$ and O$^2$ to a horizontal position, where both switches are open-circuited, thus de-energizing motor 16 and positioning valve D, Fig. 1, in a partly open condition suitable to maintain 20" vacuum steam.

As the steam supply pressure or the vacuum supply pressure changes, the balance of vacuum selector Y, Fig. 1, is upset and operates immediately via mercury switch O$^1$ if below say 19", and mercury switch O$^2$ if above 21", to re-establish 20" condition by adjusting the valve opening.

High vacuum regulator M maintains a minimum vacuum of approximately 23".

If we now assume an inside temperature of 72° F., or over, with the time switch in day position, and all other conditions as shown, we have the shut-off position.

Due to high temperature level, thermostats P$^d$ and P$^{1d}$ have closed 72° contacts, as the too-hot elements are connected in series, this is necessary to establish circuit. Current now flows from low voltage transformer T along line 200, through $d$ contacts of time switch Q, along lines 201, 202, through 72° contacts of thermostat P^d, along line 211, through 72° contacts of thermostat P^1d, along lines 210, 209, through electro-magnet of relay S', along line 208 and 207, completing the circuit and energizing relay S', causing the contact-carrying armature to move against the magnetized core, opening contacts 109—110 and closing contacts 110 and 122.

Current now flows from 110 v. supply along lines 100—101, through line switch Y', along lines 102—103, through motor 16 and field CL, through limit switch LC contacts along lines 121, 120, through closed contacts 110—122 of relay S', along lines 111—112, through line switch Y', along lines 113—114, to complete the circuit, energizing motor 16 and causing valve D, Fig. 1, to move toward full closed position, at which point limit switch LC is tripped by cam 20 of Figs. 5 and 6, de-energizing motor 16 and positioning the valve at full closed. Inasmuch as relay S is in normal or de-energized position, maintaining contacts 320—321 closed, the pump and motor control is by regulator M and a minimum vacuum of approximately 23" is maintained in line E.

Vaccum selector Y is operated by the high vacuum but is not in circuit and not effective.

Applying the first condition or situation in which we have a 1# pressure steam position, but for night level conditions, it might be assumed that the time switch Q is in its night or low level position, and the temperature is 58°, or lower, all other conditions as shown.

Current now flows from the low voltage transformer T along line 200, through the n contacts of time switch Q, along line 214, through the n contacts of emergency switch Z, along line 215—216, through the closed 58° contacts of thermostats P^n and/or P^1n, along lines 217—218—205, through electro-magnet of relay S, along lines 206—207, completing circuit.

The sequence of operation now is exactly as described for condition 1, supra.

With time switch Q in night level position, the 20" vacuum steam condition will similarly duplicate condition 2.

With time switch Q in night level position, the shut-off condition will similarly duplicate condition 3.

With reference to the night level, 1# pressure steam position, as described, with a demand continuous for high level temperature for a period of several hours, within the normal low level time period, the emergency or manual switch Z may be changed from contact position n to contact position d, and then it will be noted that the normal night level of 1# pressure steam position has been changed to the first condition outlined above, with the emergency or manual switch Z in day or high level position. This condition will remain until the manual switch Z is again restored to contact position n. The 20" vacuum steam, and the shut off positions are equally and similarly affected.

Thus, there are several conditions of operations, including normal heating under vacuum with a small differential for normal operation, a heating with higher pressure steam, and a low vacuum in return line G with a larger differential when the building becomes too cool, a shutting off of the steam, stopping circulation in the radiators when the building becomes too hot, and various incidental conditions such as night level, or emergency conditions.

When the supply of steam is entirely shut off by the closing of the steam valve D, the vacuum pump controller M may be left in operation, so that when the main steam valve D is again opened there will be a quick circulation and refilling of the radiators.

In other instances, particularly in warm weather, the vacuum pump controllers may be so arranged that the vacuum pump will be entirely cut out of operation so long as the steam valve D is closed, thus saving electric current.

In some cases the increase controller X may be omitted. When this is done the reducing valve C is set for the maximum pressure at which the system is to be operated, and the valve D, under control of the thermostats, is arranged to open wide for increased heat, is partly opened by the decrease controller Y for normal heat, and is shut off to prevent overheating, the same as in the arrangement already described.

When orifices or restrictions on the supply pipes to the radiators are used, it may be possible to operate the vacuum pump on low vacuum only, or in some cases the vacuum pump may be dispensed with entirely and the system operated above atmospheric pressure.

Of course, at all times the pump is under the control of the float J and switch K, and will operate to return the water of condensation to the boiler, whenever this is necessary by the filling up of the tank H, irrespective of how the pressures and vacuums in the system are adjusted.

Referring now to the modification shown in Figs. 2, 2b and 2c, it will be noticed that the main steam supply E beyond the steam valve D is divided into a plurality of sections as E' and E2 and that additional shut off valves D' and D2 are put in these branches. These valves D' and D2 are operated by electric motors and controlled by thermostats P' and P2. The pipes E' and E2 extend to heat different zones in the building.

Thus when a thermostat cuts over to a too hot position (72°) instead of shutting off the main control valve D, the thermostat will close its respective zone valve, D' or D2. Otherwise the operation is the same as described in connection with the apparatus illustrated in Figs. 1 and 1a.

The pressures and vacuums herein referred to describing the operation of the apparatus are merely for illustration and, of course, various adjustments in pressure and vacuums can be made to adapt the apparatus for use in various buildings.

The details and arrangement herein shown and described may be greatly varied by a skilled mechanic without departing from the scope of my invention as expressed in the claims.

Having thus fully described my invention, what I claim and desire to secure by Letters Patent is:

1. A control mechanism for a steam heating system comprising a steam supply pipe, a regulating valve in the steam supply pipe, automatically operating mechanism including a steam increase controller, and a steam decrease controller, connected to said supply pipe, electric means controlled thereby, for adjusting said valve to maintain in said system a high pressure, or a lower pressure, or to shut off the steam, and thermostatic control means for said automatically operating mechanism.

2. A control mechanism for a vacuum steam heating system comprising a steam supply pipe, a regulating valve in the steam supply pipe, automatically operating mechanism including a steam increase controller, and a steam decrease controller, connected to said supply pipe, electric means controlled thereby, for adjusting said valve to maintain in said system a high pressure, or a lower pressure, or to shut off the steam, and thermostatic control means for said automatically operating mechanism, and a vacuum pump for creating and maintaining a vacuum in the returns.

3. A control mechanism for a vacuum steam heating system comprising a steam supply pipe, a regulating valve in the steam supply pipe, automatically operating mechanism including a steam increase controller, and a steam decrease controller, connected to said supply pipe, electric means controlled thereby, for adjusting said valve to maintain in said system a high pressure, or a lower pressure, or to shut off the steam, thermostatic control means for said automatically operating mechanism, a vacuum pump for creating and maintaining a vacuum in the returns, and controllers for the pump connected so that the pump will automatically be set to create different vacuums to co-operate with the different steam pressures.

4. A control mechanism for a vacuum steam heating system, comprising a steam supply pipe, a regulating valve in the steam supply pipe, automatically operable mechanism including steam increase and decrease controllers connected to said supply pipe, electric means controlled thereby, for automatically adjusting said valve, a vacuum pump for creating and maintaining a vacuum in the returns, a thermostat connected to the valve operating mechanism to cause the same to open the valve when more steam is needed, and to close the valve when less steam is needed, thereby to maintain a determined temperature, a two-step vacuum control for the vacuum pump so connected that when the system is on low steam pressure the pump will operate to create and maintain a relatively high vacuum, and when the system is on high steam pressure the pump will operate to create and maintain a relatively low vacuum.

5. A control mechanism for a vacuum steam heating system, comprising a steam supply pipe, a regulating valve in the steam supply pipe, automatically operable mechanism including steam increase and decrease controllers connected to said supply pipe, electric means controlled thereby, for automatically adjusting said valve, a vacuum pump for creating and maintaining a vacuum in the returns, thermostats connected to the valve operating mechanism to cause the same to open the valve when more steam is needed, and to close the valve when less steam is needed, thereby to maintain a determined temperature, a plurality of vacuum controllers for the vacuum pump so connected that when the valve is partly opened, the pump will operate to create and maintain a relatively high vacuum, and when the valve is opened for a higher steam pressure, the pump will operate to create and maintain a relatively lower vacuum, and when the valve is closed, the pump will continue to maintain the relatively high vacuum.

6. A control mechanism for a vacuum steam heating system having a steam supply, radiation means, a supply pipe to said radiation means and returns from said means, comprising a regulating valve in the steam supply pipe, mechanism for automatically adjusting said valve, a vacuum pump for creating and maintaining a vacuum in the returns, a plurality of vacuum controllers for the vacuum pump, a steam increase controller and a steam decrease controller, connected to said steam supply pipe, electric means controlled by said steam increase and decrease controllers to operate said valve, and thermostats selectively connected to the increase and decrease controllers to control the temperature as described.

7. A control mechanism for a vacuum steam heating system having a steam supply, radiation means, a supply pipe to said radiation means and returns from said means, comprising a regulating valve in the steam supply pipe, mechanism for automatically adjusting said valve, a vacuum pump for creating and maintaining a vacuum in the returns, a plurality of vacuum controllers for the vacuum pump, connected to a return, a steam increase controller and a steam decrease controller connected to the steam supply pipe beyond the regulating valve, electric means controlled by said steam increase and decrease controllers to operate said valve, and thermostats selectively connected to the increase and decrease controllers to control the temperature as described.

8. A control mechanism for a vacuum steam heating system having a steam supply, radiation means, a supply pipe to said radiation means and returns from said means, comprising a regulating valve in the steam supply pipe, mechanism for automatically adjusting said valve, a vacuum pump for creating and maintaining a vacuum in the returns, a plurality of vacuum controllers for the vacuum pump, connected to a return, a steam increase controller and a steam decrease controller, connected to said steam supply pipe, electric means, including mercoid switches, controlled by said steam increase and decrease controllers to operate said valve, and thermostats selectively connected to the increase and decrease controllers to control the temperature as described.

9. In a vacuum steam heating system having steam supply means, radiation means, and return means therefor, a plurality of pressure control means, each for establishing and normally maintaining a predetermined pressure in the supply means, a plurality of pressure control means, each for establishing and normally maintaining a different predetermined pressure in the return means, thereby providing for a plurality of pressure differentials between the supply and return means, the combination with a control mechanism comprising means to select the requisite pressure control means in the supply means in accordance with temperatures in the area to be heated, and means co-operative with said last means to select the requisite pressure control means in the return means, to vary the pressure differential between the supply and return means in accordance with temperatures in the area being heated.

10. A control mechanism for a vacuum steam heating system having a steam supply pipe, comprising a regulating valve in the steam supply pipe, automatically operable mechanism including steam increase and decrease controllers, connected to said supply pipe, electric means controlled thereby, for adjusting said valve to maintain in said system a higher pressure than required to heat the area to be heated, or a lower pressure than so required, or to shut off the steam supply, thermostatic control means for said automatically operating mechanism for adjusting said valve, a vacuum pump for creating and maintaining a vacuum in the returns, and a multi-stage controller means for the pump connected automatically to set the pump to create different degrees of vacuum in accordance with the different pressures of steam, to produce variable pressure differentials for variable heat requirements in the area to be heated.

11. A vacuum steam heating system including a steam supply pipe, valve means for regulating the pressure in said supply pipe, selectively operable high and low pressure controllers arranged to respond to pressure in said supply pipe, said controllers each being provided with switches so arranged that when one is open the other is closed and vice versa, at least one of the controllers comprising a casing, a pressure actuatable diaphragm arranged in the casing responsive to the pressure in the supply pipe, a mechanical connection to the diaphragm and connections from said mechanical connection to the switches of said controller arranged to effect operation of said switches, electric means to select and control the operation of a controller, and motorized means connected to and controlled by the switches of the selected controller arranged to actuate said valve means so as to maintain in the system a pressure corresponding to that of the controller selected.

12. A vacuum steam heating system including a steam supply pipe, valve means for regulating the pressure in said supply pipe, a combined, selectively operable steam increase controller means and decrease controller means arranged to respond to pressure in said supply pipe, said controller means comprising a casing, a pressure actuatable diaphragm arranged in the casing responsive to pressure in the supply pipe, a mechanical connection to said diaphragm, means cooperative therewith to oppose motion of the diaphragm in one direction, other means cooperative therewith to oppose motion of the diaphragm in the opposite direction, said increase and decrease controller means each being provided with pivoted mercoid switches, and connections from said mechanical connection to said pivoted mercoid switches, electric means to select and control the operation of a controller means, and motorized means connected to and controlled by the switches of the selected controller means arranged to actuate said valve means so as to maintain in the system a pressure corresponding to that of the controller means selected.

13. A vacuum steam heating system including a steam supply pipe, valve means for regulating the pressure in said supply pipe, selectively operable pressure controllers arranged to respond to different pressures in said supply pipe, each of said controllers being provided with switch means, and at least one of said controllers comprising a casing, a pressure actuatable diaphragm arranged in the casing responsive to the pressure in the supply pipe, a mechanical connection to the diaphragm, means opposing the motion of said diaphragm, and connections from said mechanical connection to the switch means of said controller arranged to effect operation of said switch means, thermostatic means to select and control the operation of a controller to maintain a predetermined pressure in the system, and motorized means connected to and controlled by the switch means of the selected controller arranged to actuate said valve means so as to maintain in the system a pressure corresponding to that of the controller selected.

14. A vacuum steam heating system including a steam supply pipe, valve means for regulating the pressure in said supply pipe, selectively operable steam increase and decrease controllers arranged to respond to pressure in said supply pipe, each of said controllers being provided with switch means, said controllers each comprising a casing, a pressure actuatable diaphragm arranged in the casing responsive to pressure in the supply pipe, a mechanical connection to the diaphragm, means opposing the motion of said diaphragm, the opposing means of one controller being arranged to oppose the upward movement of the diaphragm, and the opposing means of the other controller being arranged to oppose the downward movement of its diaphragm, and connections from the mechanical connection of each controller to the switch means of the respective controller arranged to effect operation of said switch means, electric means to select and control the operation of a controller, and motorized means connected to and controlled by the switches of the selected controller arranged to actuate said valve means so as to maintain in the system a pressure corresponding to that of the controller selected.

15. A vacuum steam heating including a steam supply pipe, valve means for regulating the pressure in said supply pipe, a combined selectively operable steam increase controller means and decrease controller means arranged to respond to pressure in said supply pipe, said combined controller means comprising a casing, a pressure actuatable diaphragm arranged in the casing responsive to pressure in the supply pipe, a mechanical connection to said diaphragm, means cooperative with said mechanical connection for opposing the upward movement of the diaphragm, and means cooperative with said mechanical connection for opposing the downward movement of the diaphragm, means for adjusting said mechanical connection, said increase and decrease controller means each being provided with pivoted mercoid switches, and connections from said mechanical connection to said pivoted mercoid switches, thermostatic means to select and control the operation of a controller means to maintain a predetermined pressure in the system, and motorized means connected to and controlled by the switches of the selected controller means arranged to actuate said valve means so as to maintain in the system a pressure corresponding to that of the controller means selected.

16. A vacuum steam heating system including a steam supply pipe, valve means for regulating the pressure in said supply pipe, selectively operable pressure controllers arranged to respond to different pressures in said supply pipe, each of said controllers being provided with switch means, and at least one of said controllers comprising a casing, a pressure actuatable diaphragm arranged in the casing responsive to the pressure in the supply pipe, a mechanical connection to the diaphragm, means opposing the motion of said diaphragm, and connections from said mechanical connections to the switch means of said controller arranged to effect operation of said switch means, thermostatic means to select and control the operation of a controller to maintain a predetermined pressure in the system, motorized means connected to and controlled by the switch means of the selected controller arranged to actuate said valve means so as to maintain in the system a pressure corresponding to that of the controller selected, said motorized means comprising a valve stem, a rack on said stem, an electrical valve actuator adjacent the valve stem, gearing connecting said actuator to said rack bar, and connections between said actuator and said switch means.

IRVING C. JENNINGS.